(12) United States Patent
Kim

(10) Patent No.: US 9,826,193 B2
(45) Date of Patent: Nov. 21, 2017

(54) APPARATUS AND METHOD OF CONVERTING IMAGE SIGNAL

(71) Applicant: Hanwha Techwin Co., Ltd., Changwon-si (KR)

(72) Inventor: Seonggon Kim, Changwon-si (KR)

(73) Assignee: Hanwha Techwin Co., Ltd., Changwon-si (KR)

( * ) Notice: Subject to any disclaimer, the term of this patent is extended or adjusted under 35 U.S.C. 154(b) by 0 days.

(21) Appl. No.: 14/808,065

(22) Filed: Jul. 24, 2015

(65) Prior Publication Data

US 2016/0286159 A1    Sep. 29, 2016

(30) Foreign Application Priority Data

Mar. 25, 2015  (KR) .................... 10-2015-0041650

(51) Int. Cl.
*H04N 7/01* (2006.01)
*H04N 5/341* (2011.01)

(52) U.S. Cl.
CPC .......... *H04N 7/0102* (2013.01); *H04N 5/341* (2013.01)

(58) Field of Classification Search
CPC .. H04N 7/0102; H04N 7/0127; H04N 7/0132; H04N 5/374; H04N 5/92; H04N 11/22
See application file for complete search history.

(56) References Cited

U.S. PATENT DOCUMENTS

| | | | | |
|---|---|---|---|---|
| 4,575,757 A | * | 3/1986 | Aschwanden | H04N 9/45 331/20 |
| 4,613,903 A | * | 9/1986 | Nadan | H04N 11/14 348/E11.003 |
| 4,920,418 A | * | 4/1990 | Robinson | H04N 5/2259 348/219.1 |
| 5,272,524 A | * | 12/1993 | Nagumo | H04N 9/045 341/61 |
| 5,287,171 A | * | 2/1994 | Ohtsubo | H04N 5/06 348/222.1 |
| 5,347,321 A | * | 9/1994 | Gove | H04N 9/78 348/445 |

(Continued)

FOREIGN PATENT DOCUMENTS

| | | |
|---|---|---|
| JP | 7-336654 A | 12/1995 |
| JP | 3249372 B2 | 1/2002 |

(Continued)

*Primary Examiner* — Brian Yenke
(74) *Attorney, Agent, or Firm* — Sughrue Mion, PLLC

(57) ABSTRACT

Provided are an apparatus and method of converting a digital image signal, which is obtained through an image sensor comprising a plurality of pixels that are arranged in a matrix, into an analog image signal in order to transmit the analog image signal to a monitor device that outputs an image complying with a national television system committee (NTSC) standard or a phase-alternating line (PAL) standard. The method includes: generating a sample frequency based on the number of horizontal pixels of the digital image signal to comply with a horizontal scan period of the NTSC standard or the PAL standard; and converting image data of the horizontal pixels of the digital image signal into the analog image signal, according to the sample frequency.

19 Claims, 18 Drawing Sheets

(56) References Cited

U.S. PATENT DOCUMENTS

| | | | | |
|---|---|---|---|---|
| 5,450,129 A * | 9/1995 | Matoba | H04N 1/2112 | 348/294 |
| 5,459,510 A * | 10/1995 | Hamalainen | H04N 5/3577 | 348/317 |
| 5,459,520 A * | 10/1995 | Sasaki | H04N 7/0102 | 348/222.1 |
| 5,546,511 A * | 8/1996 | Kwak | H04N 1/00294 | 358/1.6 |
| 5,587,744 A * | 12/1996 | Tanaka | H04N 9/64 | 348/553 |
| 5,724,101 A * | 3/1998 | Haskin | G06F 19/321 | 348/441 |
| 5,726,707 A * | 3/1998 | Sakurai | H04N 5/235 | 348/222.1 |
| 5,754,248 A * | 5/1998 | Faroudja | H04N 7/0112 | 348/429.1 |
| 6,067,571 A * | 5/2000 | Igarashi | H04L 29/06 | 348/14.1 |
| 6,144,411 A * | 11/2000 | Kobayashi | H04N 21/4108 | 348/231.6 |
| 6,370,198 B1 * | 4/2002 | Washino | H04N 7/0127 | 348/441 |
| 6,480,230 B1 * | 11/2002 | Honma | H04N 5/23293 | 345/603 |
| 6,720,991 B1 * | 4/2004 | Choi | H04N 5/765 | 348/207.1 |
| 6,801,250 B1 * | 10/2004 | Miyashita | G06T 3/4015 | 348/208.13 |
| 7,009,628 B2 * | 3/2006 | Neal | G09G 3/20 | 345/3.3 |
| 7,009,655 B2 * | 3/2006 | Huang | G11B 27/034 | 348/441 |
| 7,065,288 B1 * | 6/2006 | Xue | H04N 5/765 | 348/207.1 |
| 7,071,992 B2 * | 7/2006 | Chen | G09G 5/008 | 348/441 |
| 7,102,690 B2 * | 9/2006 | Lee | H04N 5/06 | 348/542 |
| 7,206,025 B2 * | 4/2007 | Choi | G09G 5/006 | 348/441 |
| 7,453,519 B2 * | 11/2008 | Kubota | H04N 7/0105 | 348/222.1 |
| 7,599,006 B2 | 10/2009 | Tashiro | | |
| 7,649,552 B2 * | 1/2010 | Fukuda | G11B 27/34 | 348/220.1 |
| 7,702,015 B2 * | 4/2010 | Richter | H04N 5/77 | 348/121 |
| 7,733,406 B2 * | 6/2010 | Kurosawa | G09G 3/3607 | 345/698 |
| 7,860,321 B2 * | 12/2010 | Watanabe | H04N 5/232 | 348/443 |
| 7,995,652 B2 * | 8/2011 | Washington | H04N 5/77 | 348/14.12 |
| 8,264,608 B2 * | 9/2012 | Nakamura | H04N 5/46 | 348/555 |
| 2003/0058236 A1 * | 3/2003 | Neal | G09G 5/008 | 345/213 |
| 2004/0174436 A1 * | 9/2004 | Miyahara | H04N 3/1562 | 348/219.1 |
| 2005/0012826 A1 * | 1/2005 | Hattori | H04N 3/1562 | 348/220.1 |
| 2005/0093982 A1 * | 5/2005 | Kuroki | H04N 3/1593 | 348/207.99 |
| 2005/0219366 A1 * | 10/2005 | Hollowbush | H04N 17/004 | 348/193 |
| 2005/0286780 A1 * | 12/2005 | Takahashi | H04N 5/23245 | 382/232 |
| 2006/0072023 A1 * | 4/2006 | Kurosawa | G09G 3/3607 | 348/294 |
| 2007/0070254 A1 * | 3/2007 | Cazier | H04N 17/00 | 348/723 |
| 2007/0285519 A1 * | 12/2007 | Ahn | H04N 5/76 | 348/208.6 |
| 2008/0002045 A1 * | 1/2008 | Wallach | H04N 7/185 | 348/311 |
| 2008/0018787 A1 * | 1/2008 | Hopper | H04N 5/77 | 348/448 |
| 2008/0094516 A1 * | 4/2008 | Lim | H04N 7/18 | 348/646 |
| 2008/0100742 A1 * | 5/2008 | Mogre | H04N 5/08 | 348/445 |
| 2010/0053836 A1 * | 3/2010 | Xiu | H01Q 1/247 | 361/119 |
| 2011/0199482 A1 * | 8/2011 | Morgan | H04N 5/2251 | 348/143 |
| 2012/0140067 A1 * | 6/2012 | Crossen | H04N 7/18 | 348/143 |
| 2016/0269670 A1 * | 9/2016 | Kim | H04N 7/01 | |

FOREIGN PATENT DOCUMENTS

| | | |
|---|---|---|
| KR | 10-0577195 B1 | 5/2006 |
| KR | 10-0786043 B1 | 12/2007 |

* cited by examiner

APPARATUS AND METHOD OF CONVERTING IMAGE SIGNAL

CROSS-REFERENCE TO THE RELATED APPLICATION

This application claims priority from Korean Patent Application No. 10-2015-0041650, filed on Mar. 25, 2015, in the Korean Intellectual Property Office, the disclosure of which is incorporated herein in its entirety by reference.

BACKGROUND

1. Field

Apparatuses and methods consistent with exemplary embodiments relate to converting an image signal.

2. Description of the Related Art

An analog camera that supports a television broadcast standard such as a national television system committee (NTSC) standard or a phase-alternating line (PAL) standard has low resolving power due to the restriction of the television broadcast standard and a charge-coupled device (CCD) sensor included in the analog camera that has a low resolution. As a complementary metal-oxide-semiconductor (CMOS) sensor having high resolving power has become commonly used, it is necessary to develop a camera having high resolving power and complying with the NTSC standard or the PAL standard. When a camera system captures a high-resolution image, a transmission device for processing high-resolution image data and a display device for reproducing the high-resolution image data have to be additionally installed in order to transmit and reproduce the high-resolution image.

However, since a transmission device is part of an image transmission system that is already widely installed in order to transmit analog image data, it is difficult to install an additional transmission device for processing high-resolution image data. Also, it is time consuming and costly to replace display devices that are already widely installed and comply with an analog television broadcast standard with display devices complying with a digital television broadcast standard.

Accordingly, there is a demand to develop a technology of receiving high-resolution image data that is generated by a camera and storing or reproducing the high-resolution image data while using a transmission device and a display device that are already installed to transmit analog image data according to an analog television broadcast standard.

SUMMARY

Exemplary embodiments of the inventive concept provide an apparatus and method of converting a digital image signal into an analog image signal that complies with an analog television broadcast standard such as the NTSC or PAL standard.

Various aspects of the inventive concept will be set forth in part in the description which follows and, in part, will be apparent from the description, or may be learned by practice of the presented embodiments.

According to one or more exemplary embodiments, there is provided a method of converting a digital image signal, which is obtained through an image sensor comprising a plurality of pixels that are arranged in a matrix, into an analog image signal in order to transmit the analog image signal to a monitor which is configured to output an image complying with the NTSC standard or the PAL standard. The method may include: generating a sample frequency based on the number of horizontal pixels of the digital image signal to comply with a horizontal scan period of the NTSC standard or the PAL standard; and converting image data of the horizontal pixels of the digital image signal into the analog image signal, according to the sample frequency.

The method may further include changing the number of horizontal scan lines of the digital image signal to comply with a vertical resolution of the NTSC standard or the PAL standard.

The image sensor may be a complementary metal-oxide-semiconductor (CMOS) image sensor.

The horizontal scan period according to the NTSC standard may be 63.556 μs.

In the number of horizontal pixels, the number of effective horizontal pixels may be 1320, the horizontal scan period may include an effective horizontal scan period of 53.333 μs, and the sample frequency may be generated at 24.75 MHz.

In the number of horizontal pixels, the number of effective horizontal pixels may be 1200 and the number of dummy horizontal pixels may be 230, and the sample frequency may be generated at 22.5 MHz.

The horizontal scan period according to the PAL standard may be 64 μs.

In the number of horizontal pixels, the number of effective horizontal pixels may be 1200 and the number of dummy horizontal pixels may be 240, and the sample frequency may be generated at 22.5 MHz.

According to one or more exemplary embodiments, there is provided an apparatus for converting a digital image signal, which is obtained through an image sensor comprising a plurality of pixels that are arranged in a matrix, into an analog image signal in order to transmit the analog image signal to a monitor which is configured to output an image complying with the NTSC standard or the PAL standard. The apparatus may include a receiver configured to receive the digital image signal; a controller configured to generate a sample frequency based on a number of horizontal pixels of the digital image signal to comply with a horizontal scan period of the NTSC standard or the PAL standard, and convert image data of the horizontal pixels of the digital image signal into the analog image signal according to the sample frequency; and a transmitter configured to transmit the analog image signal to the monitor.

The controller may change the number of horizontal scan lines of the digital image signal to comply with a vertical resolution of the NTSC standard or the PAL standard.

In the number of horizontal pixels of the digital image signal, the number of effective horizontal pixels may be 1200, and the controller may generate the sample frequency at 22.5 MHz, wherein the apparatus further includes: a video amplifier that amplifies the analog image signal; and a low-pass filter that passes through the amplified analog image signal and has a cutoff frequency of 11.25 MHz.

According to the one or more exemplary embodiments, there may be provided an apparatus and method of converting an image signal into an image signal that complies with an analog television broadcast standard.

BRIEF DESCRIPTION OF THE DRAWINGS

These and/or other aspects will become apparent and more readily appreciated from the following description of the embodiments, taken in conjunction with the accompanying drawings, in which.

DETAILED DESCRIPTION OF THE EXEMPLARY EMBODIMENTS

Figure 1A:
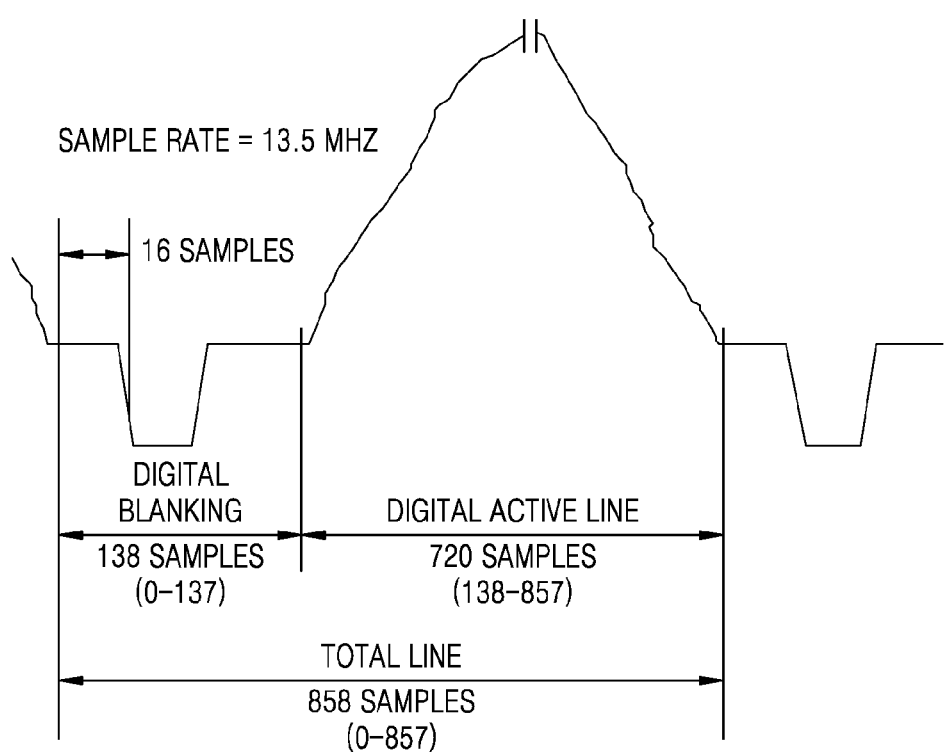
FIGS. 1A and 1B are graphs for explaining a sample frequency of an image signal complying with a national television system committee (NTSC) standard, according to exemplary embodiments.

The inventive concept will now be described more fully with reference to the accompanying drawings, in which exemplary embodiments of the inventive concept are shown. It should be understood, however, that there is no intent to limit exemplary embodiments of the inventive concept to the particular forms disclosed, but conversely, exemplary embodiments of the inventive concept are to cover all modifications, equivalents, and alternatives falling within the spirit and scope of the inventive concept Also, while describing the inventive concept, detailed descriptions about related well-known functions or configurations that may blur the points of the inventive concept are omitted.

Reference will now be made in detail to the exemplary embodiments which are illustrated in the accompanying drawings. In the drawings, the same elements are denoted by the same reference numerals, and a repeated explanation thereof will not be given.

As used herein, the term "and/or" includes any and all combinations of one or more of the associated listed items. Expressions such as "at least one of," when preceding a list of elements, modify the entire list of elements and do not modify the individual elements of the list.

Hereinafter, a sample frequency and a sample rate have the same meaning and thus may be interchangeably used.

Figure 1B:
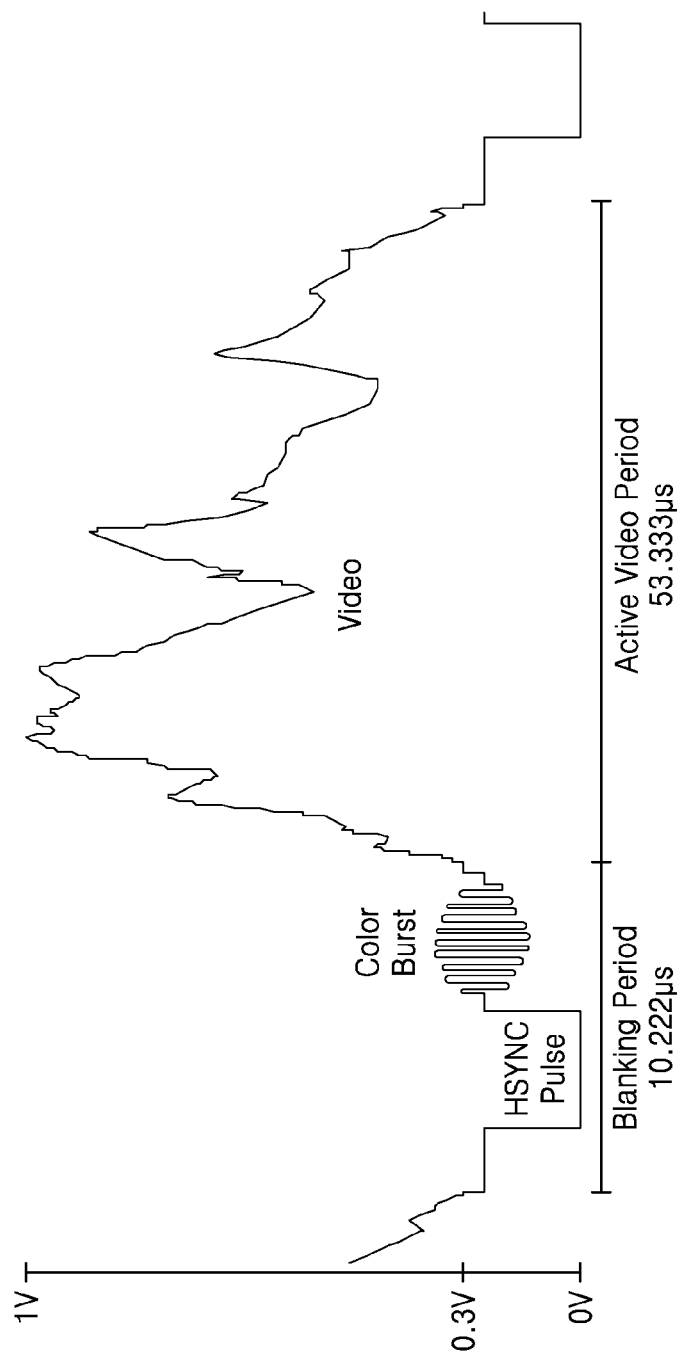

FIGS. 1A and 1B are graphs for explaining a sample frequency of an image signal complying with a national television system committee (NTSC) standard, according to exemplary embodiments.

Referring to FIG. 1A, a sample frequency of an image signal complying with the NTSC standard is 13.5 MHz.

Hereinafter, the number of horizontal scan lines refers to a vertical resolution and the number of horizontal pixels refers to the number of pixels per scan line.

A horizontal scan period of the image signal is a value obtained by dividing the number of horizontal pixels by the sample frequency. For example, when the number of horizontal pixels is 858 (samples), the horizontal scan period is 63.556 μs. In this case, when the number of effective horizontal pixels is 720, an effective horizontal scan period is 53.333 μs, and when the number of horizontal dummy horizontal pixels is 138, a dummy horizontal scan period is 10.222 μs.

Referring to FIG. 1B, in the horizontal scan period complying with the NTSC standard, a dummy horizontal scan period (or blanking period) includes intervals for which a horizontal synchronization signal HSYNC Pulse and a color synchronization signal Color Burst are transmitted, and an effective horizontal scan period includes an interval for which an effective image signal Video is transmitted.

Although not shown in FIGS. 1A and 1B, a vertical resolution of the image signal complying with the NTSC standard is 525 lines and a frame rate of the image signal is 30 Hz.

Figure 2A:
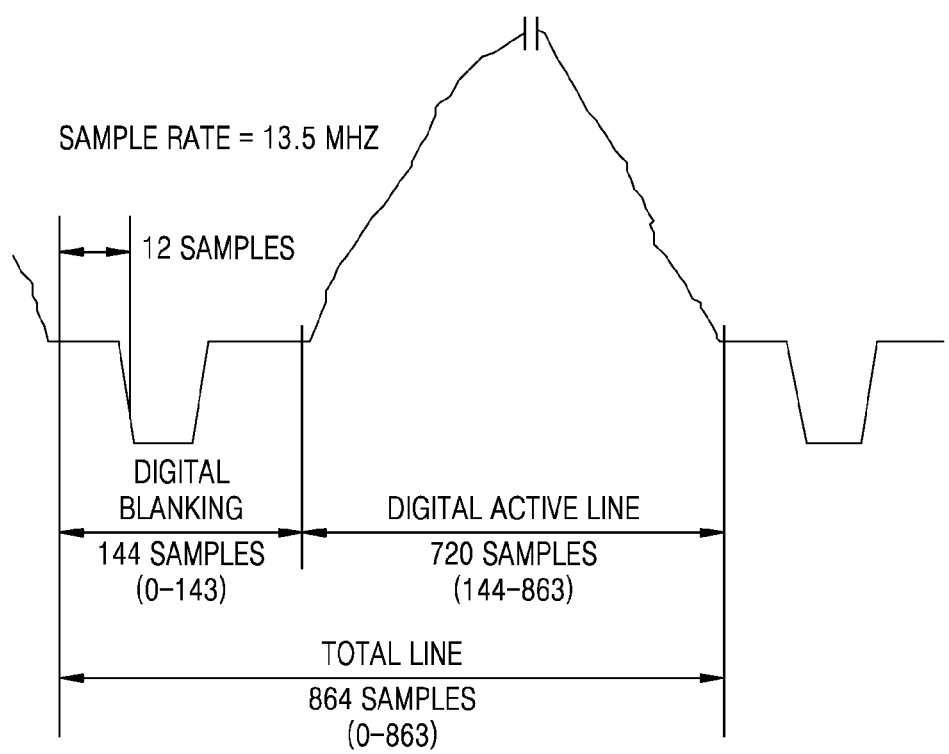
FIGS. 2A and 2B are graphs for explaining a sample frequency of an image signal complying with a phase-alternating line (PAL) standard, according to exemplary embodiments.
Figure 2B:
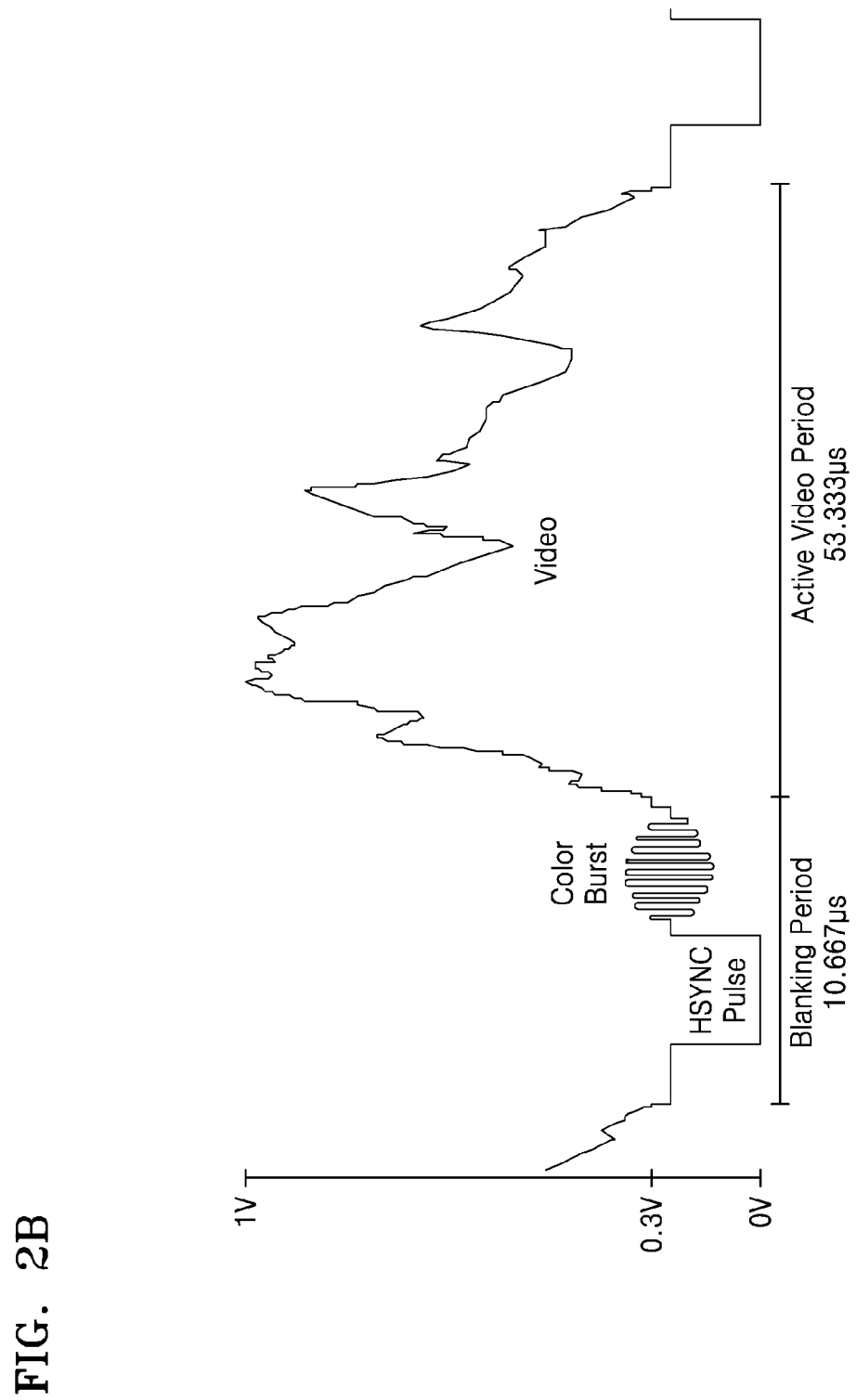

FIGS. 2A and 2B are graphs for explaining a sample frequency of an image signal complying with a phase-alternating line (PAL) standard, according to exemplary embodiments.

Referring to FIG. 2A, a sample frequency of an image signal complying with the PAL standard is 13.5 MHz.

A horizontal scan period of the image signal is a value obtained by dividing the number of horizontal pixels by the sample frequency. For example, when the number of horizontal pixels is 864, the horizontal scan period is 64 μs. In this case, when the number of effective horizontal pixels is 720, an effective horizontal scan period is 53.333 μs, and when the number of dummy horizontal pixels is 144, a dummy horizontal scan period is 10.667 μs.

Referring to FIG. 2B, in the horizontal scan period complying with the PAL standard, a dummy horizontal scan period includes intervals for which a horizontal synchronization signal HSYNC Pulse and a color synchronization signal Color Burst are transmitted, and an effective horizontal scan period includes an interval for which an effective image signal Video is transmitted.

Although not shown in FIGS. 2A and 2B, a vertical resolution of the image signal complying with the PAL standard is 625 lines, and a frame rate of the image signal is 25 Hz.

Figure 3:
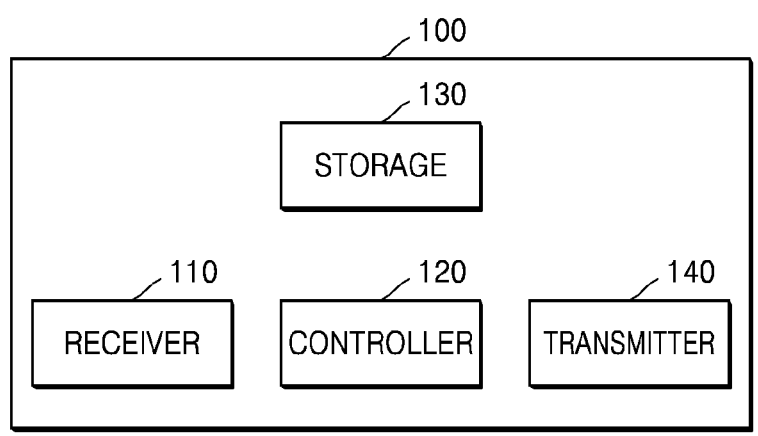
FIG. 3 is a block diagram illustrating an apparatus for converting an image signal, according to an exemplary embodiment.

FIG. 3 is a block diagram illustrating an apparatus 100 for converting an image signal, according to an exemplary embodiment.

Referring to FIG. 3, the apparatus 100 according to an exemplary embodiment includes a receiver 110, a controller 120, a storage 130, and a transmitter 140.

The receiver 110 receives a digital image signal.

For example, the receiver 110 may include an image sensor, for example, a complementary metal-oxide-semiconductor (CMOS) image sensor, including a plurality of pixels that are arranged in a matrix form. The number of effective horizontal pixels of the image sensor may be 960, 1200, or 1320. The image sensor may convert an optical signal into an electrical signal, may amplify the electrical signal, and may store the amplified electrical signal as a digital image signal.

Alternatively, the receiver 110 may receive a digital image signal from a separate image sensor. The number of effective horizontal pixels of the digital image signal that is received by the receiver 110 may be 960, 1200, or 1320.

The receiver 110 receives information about an NTSC or PAL standard.

For example, the receiver 110 may receive information about an effective horizontal scan period, a vertical resolution, and a frame rate complying with the NTSC or PAL standard.

The controller 120 controls operations of the receiver 110, the storage 130, and the transmitter 140.

The controller 120 analyzes the digital image signal that is received from the receiver 110. For example, the controller 120 may analyze the number of horizontal scan lines and/or the number of horizontal pixels of the digital image signal.

The controller 120 changes the number of horizontal scan lines of the digital image signal to comply with the vertical resolution complying with the NTSC or PAL standard. For example, the controller 120 may vertically compress the digital image signal so that the number of effective horizontal scan lines of the digital image signal is 486 or 576, complying with the vertical resolution of the NTSC or PAL standard, respectively.

The controller 120 generates a sample frequency that complies with a horizontal scan period complying with the NTSC or PAL standard based on the number of horizontal pixels of the digital image signal. As described above with reference to FIGS. 1A through 2B, an effective horizontal scan period complying with the NTSC or PAL standard is 53.333 μs.

For example, when the number of effective horizontal pixels of the digital image signal is 960, the controller 120 may control a sample frequency to be 18 MHz so that the effective horizontal scan period is 53.333 μs complying with the NTSC or PAL standard.

Alternatively, when the number of effective horizontal pixels of the digital image signal is 1200, the controller 120 may generate a sample frequency at 22.5 MHz so that the effective horizontal scan period is 53.333 μs complying with the NTSC or PAL standard.

Alternatively, when the number of effective horizontal pixels of the digital image signal is 1320, the controller 120 may generate a sample frequency at 24.75 MHz so that the effective horizontal scan period is 53.333 is complying with the NTSC or PAL standard.

Next, the controller 120 converts the digital image signal into an analog image signal, according to the sample frequency.

For example, the controller 120 may convert image data of horizontal pixels of a digital image signal of which the number of effective horizontal pixels is 960 into an analog image signal, according to the sample frequency of 18 MHz.

Alternatively, the controller 120 may convert image data of horizontal pixels of a digital image signal of which the number of effective horizontal pixels is 1200 into an analog image signal, according to the sample frequency of 22.5 MHz.

Alternatively, the controller 120 may convert image data of horizontal pixels of a digital image signal of which the number of effective horizontal pixels is 1320 into an analog image signal, according to the sample frequency of 24.75 MHz.

When converting a digital image signal into an analog image signal, the controller 120 according to an exemplary embodiment may convert a digital image signal that is encoded by using a quadrature amplitude modulation (QAM) scheme into an analog image signal, and may output an analog image signal that is encoded by using the QAM scheme. For example, the controller 120 may include, but is not limited to, a TV encoder that encodes a digital image signal by using the QAM scheme and a digital-analog converter (DAC) that converts the encoded digital image signal into an analog image signal so that a high-frequency component of the encoded digital image signal is preserved.

The storage 130 stores information about the horizontal scan period, the sample frequency according to the number of horizontal pixels, the vertical resolution, and the frame rate.

For example, the storage 130 may store information about the effective horizontal scan period, the vertical resolution, and the frame rate complying with the NTSC or PAL standard that is received from the outside. The storage 130 may store, but is not limited to, information about the sample frequency complying with the NTSC or PAL standard that is received from the outside and/or information about the sample frequency that is generated by the controller 120 based on the number of horizontal pixels to comply with the NTSC or PAL standard.

The transmitter 140 transmits the analog image signal to the outside. For example, the transmitter 140 may transmit the analog image signal to a monitor that outputs an image according to the NTSC or PAL standard.

Figure 4:
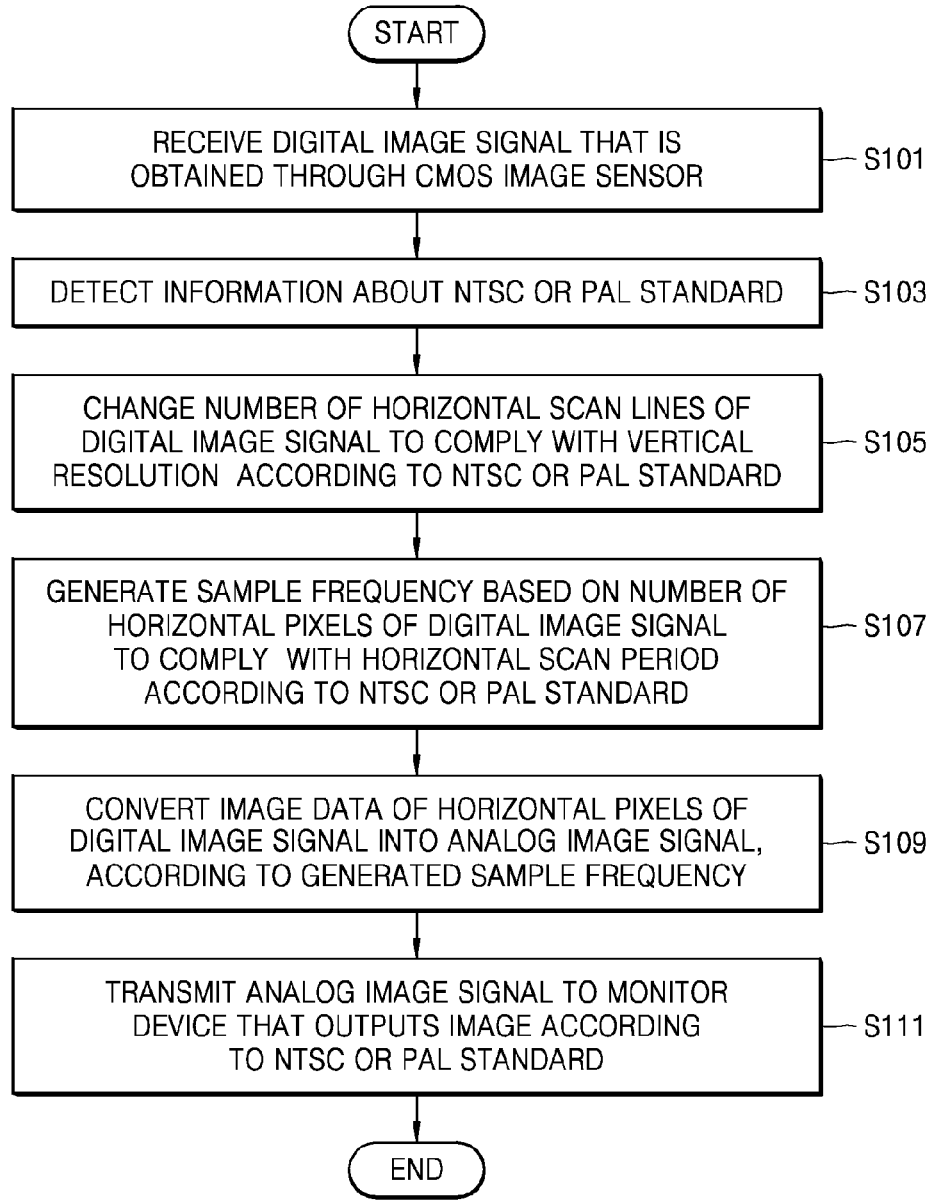
FIG. 4 is a flowchart of a method of converting an image signal, according to an exemplary embodiment.

FIG. 4 is a flowchart of a method of converting an image signal, according to an exemplary embodiment.

Referring to FIG. 4, in operation S101, the apparatus 100 according to an exemplary embodiment receives a digital image signal that is obtained through a CMOS image sensor.

Next, in operation S103, the controller 120 detects information about an NTSC or PAL standard from the storage 130. The information about the NTSC standard may include, for example, a vertical resolution of 525 lines and/or an effective horizontal scan period of 53.333 μs. The information about the PAL standard may include, for example, a vertical resolution of 625 lines and/or an effective horizontal scan period of 53.333 μs.

In operation S105, the controller 120 changes the number of horizontal scan lines of the digital image signal to comply with a vertical resolution of the NTSC or PAL standard. For example, the controller 120 may vertically compress the digital image signal so that the number of effective horizontal scan lines of the digital image signal is 486 complying with the NTSC standard. Alternatively, the controller 120 may vertically compress the digital image signal so that the number of effective horizontal scan lines of the digital image signal is 576 complying with the PAL standard.

In operation S107, the controller 120 generates a sample frequency based on the number of horizontal pixels of the digital image signal to comply with a horizontal scan period complying with the NTSC or PAL standard.

For example, the controller 120 may generate a sample frequency of a digital image signal of which the number of effective horizontal pixels is 960 at 18 MHz, a sample frequency of a digital image signal of which the number of effective horizontal pixels is 1200 at 22.5 MHz, and a sample frequency of a digital image signal of which the number of effective horizontal pixels is 1320 at 24.75 MHz, to comply with an effective horizontal scan period of 53.333 μs of the NTSC standard.

Alternatively, the controller 120 may generate a sample frequency of a digital image signal of which the number of effective horizontal pixels is 960 at 18 MHz, the sample frequency of the digital image signal of which the number of effective horizontal pixels is 1200 at 22.5 MHz, and the sample frequency of the digital image signal of which the number of effective horizontal pixels is 1320 at 24.75 MHz, to comply with an effective horizontal scan period of 53.333 µs of the PAL standard.

Next, in operation S109, the controller 120 converts image data of horizontal pixels of the digital image signal into an analog image signal, according to the sample frequency.

For example, the controller 120 may convert the digital image signal of which the number of effective horizontal pixels is 960, 1200, or 1320 into an analog image signal, according to the sample frequency of 18 MHz, 22.5 MHz, or 24.75 MHz, respectively.

Next, in operation S111, the transmitter 140 transmits the analog image signal that is obtained by the controller 120 to a monitor that outputs an image complying with the NTSC or PAL standard.

As such, the method of converting an image signal according to the present exemplary embodiment may output a high-resolution image to an analog monitor complying with the NTSC or PAL standard.

Figure 5:
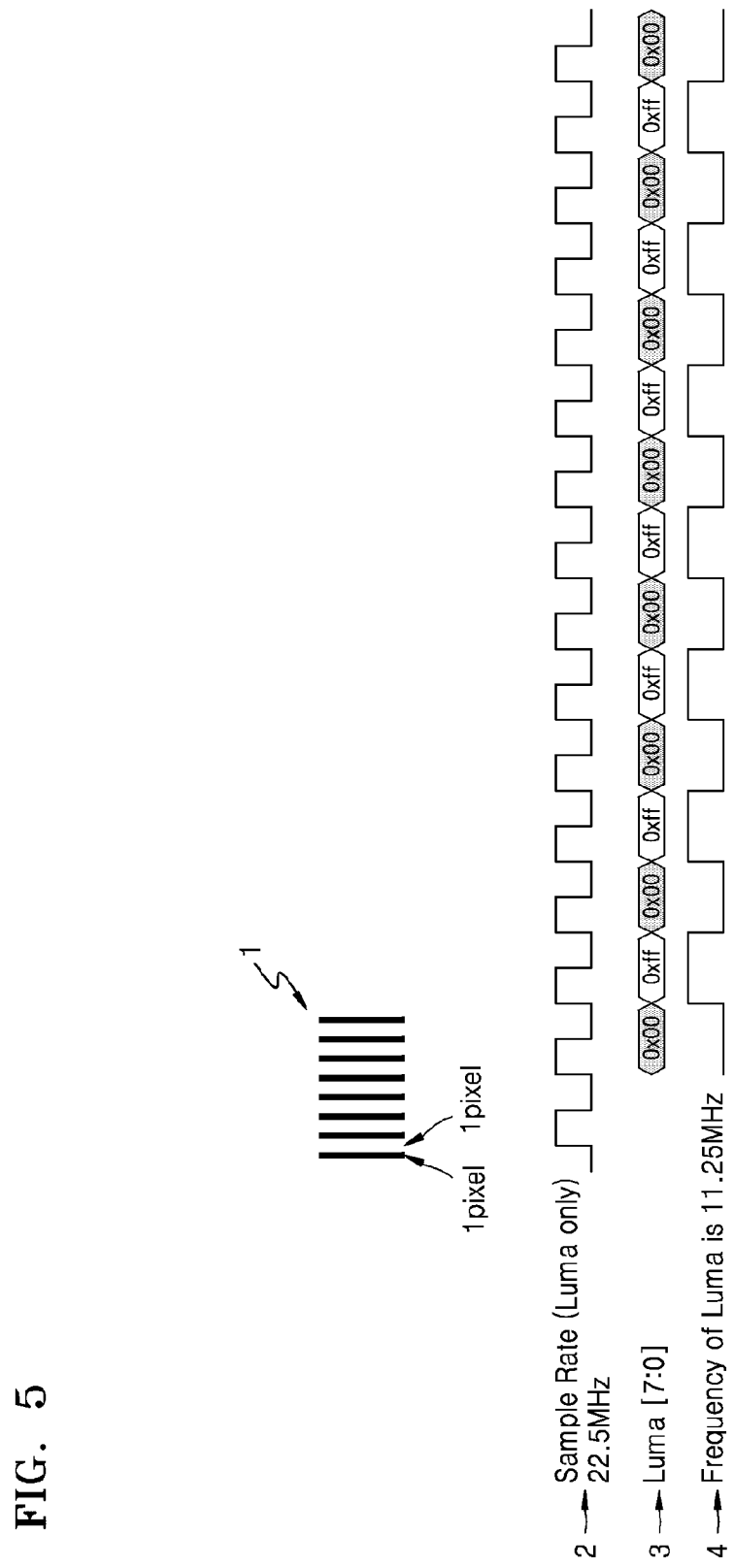
FIG. 5 is a diagram for explaining a bandwidth of an apparatus for converting an image signal, according to an exemplary embodiment.

FIG. 5 is a diagram for explaining a bandwidth of an apparatus for converting an image signal, according to an exemplary embodiment.

Referring to FIG. 5, a test pattern 1 of a TV encoder for outputting an analog image signal according to an NTSC or PAL standard may include vertical lines, and a width of each of black and white lines is one pixel.

A sample frequency 2 of the TV encoder according to an exemplary embodiment is 22.5 MHz. When only a Luma component 3 of an image signal is examined, a bandwidth 4 of the Luma component 3 of the image signal is 11.25 MHz. Accordingly, a DAC that receives an output of the TV encoder shows good magnitude response characteristics at 11.25 MHz. Also, a bandwidth of a video amplifier that receives an output of the DAC has to be equal to or greater than 11.25 MHz in order to preserve a high resolution of the image signal.

Figure 6:
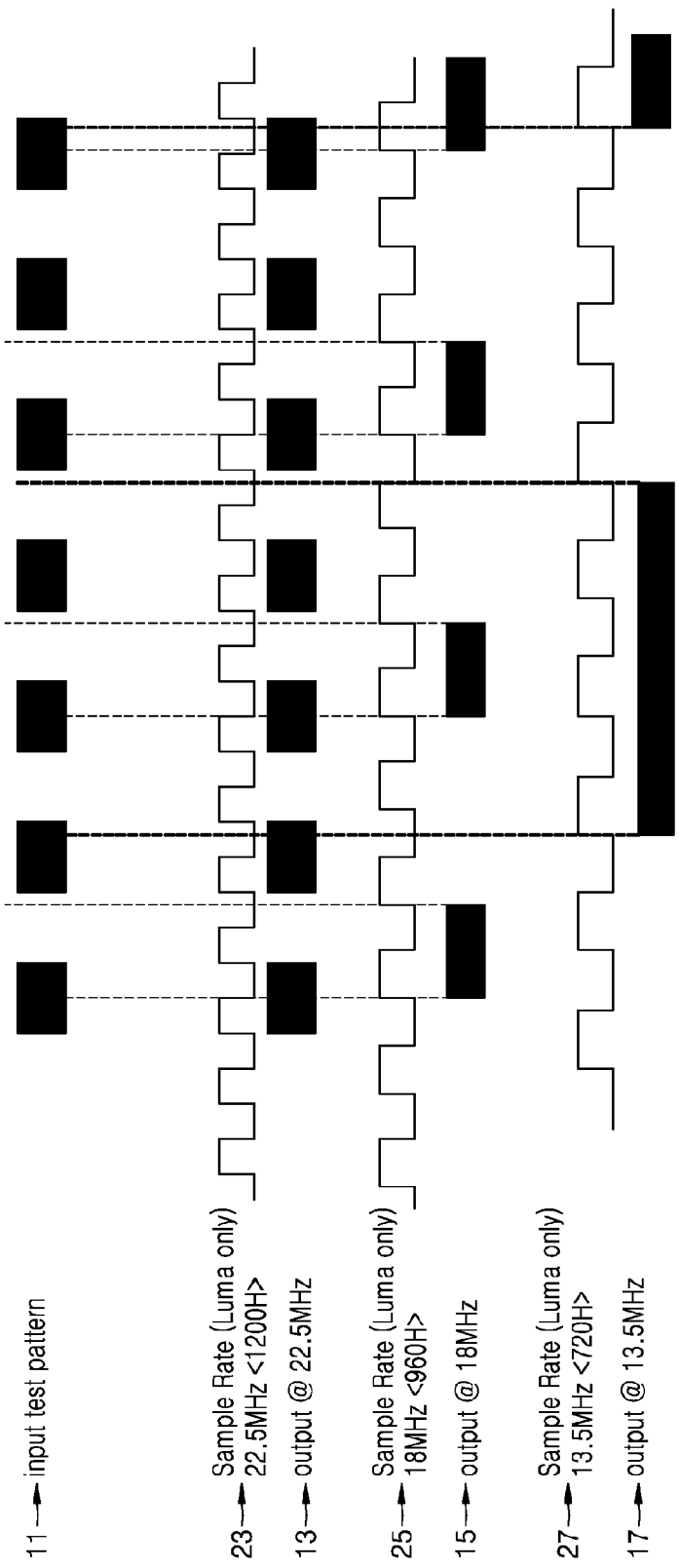
FIG. 6 is a diagram for explaining a sample frequency of an apparatus for converting an image signal, according to various exemplary embodiments.

FIG. 6 is a diagram for explaining a sample frequency of an apparatus for converting an image signal, according to various exemplary embodiments.

Referring to FIG. 6, a TV encoder may obtain different output images 13, 15, and 17 by applying different sampling frequencies to the same input test pattern 11. The input test pattern 11 may include, for example, black pixels and white pixels that are alternately arranged and the number of effective horizontal pixels of the input test pattern 11 may be 1200.

For example, the TV encoder may obtain the output image 13 having the same pattern as the input test pattern 11 by applying a sample frequency 23 of 22.5 MHz to the input test pattern 11. Alternatively, the TV encoder may obtain the output images 15 and 17 having patterns that are different from the input test pattern 11 by respectively applying sampling frequencies 25 and 27 of 18 MHz and 13.5 MHz to the input test pattern 11.

As such, according to the present exemplary embodiments, since a sample frequency that is proportional to a resolution of an analog image signal is used during signal conversion, a horizontal scan period according to an NTSC or PAL standard may be maintained constant and a high-resolution image according to the NTSC or PAL standard may be output.

Figure 7:
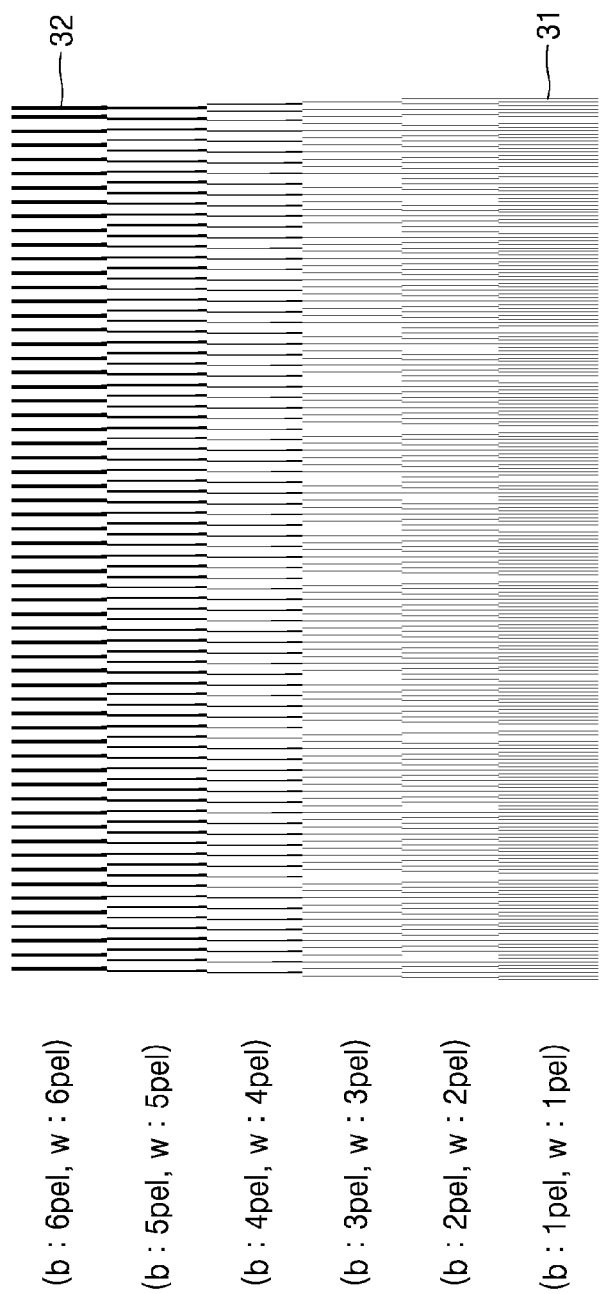
FIGS. 7 through 9 are diagrams for explaining a difference between sampling frequencies of an apparatus for converting an image signal, according to various exemplary embodiments.
Figure 8:
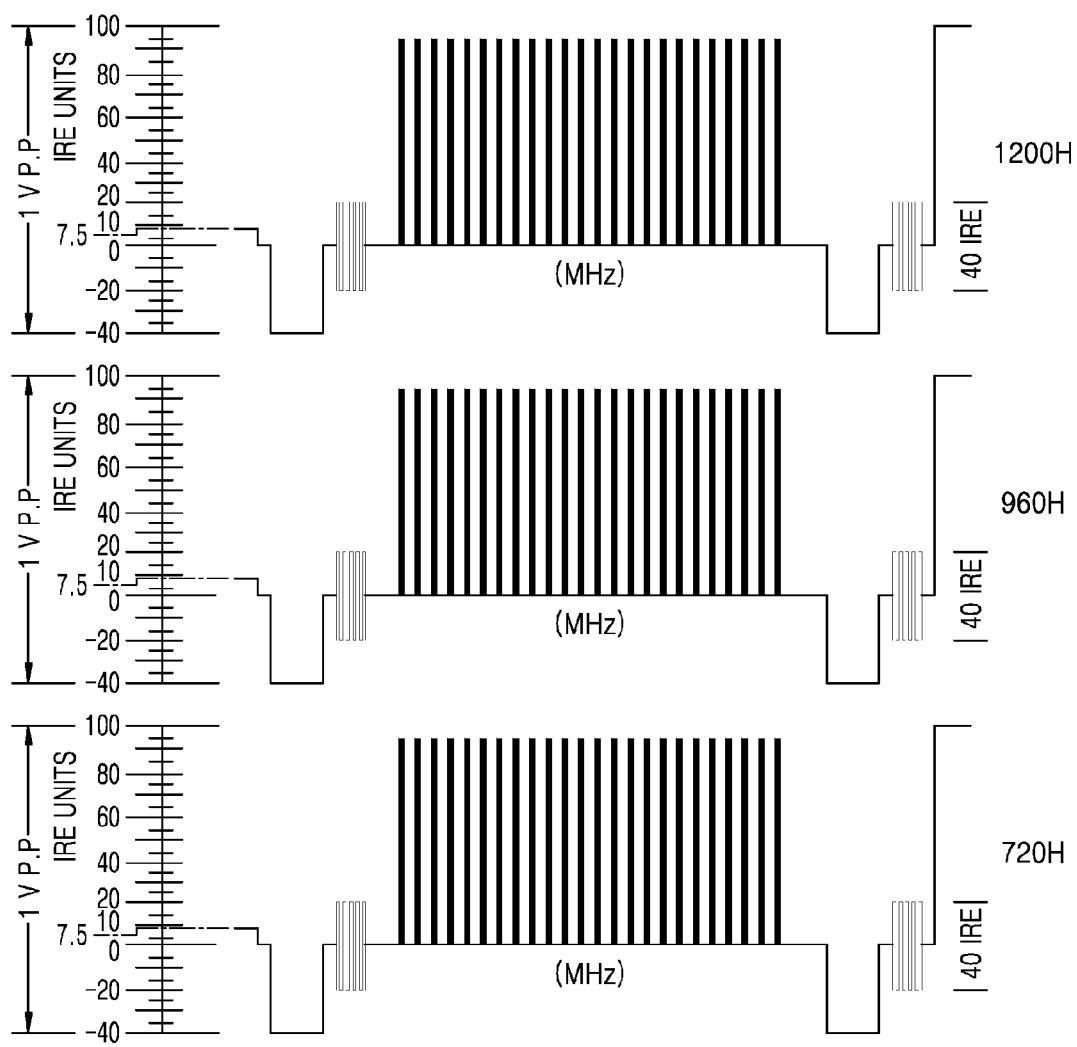
Figure 9:
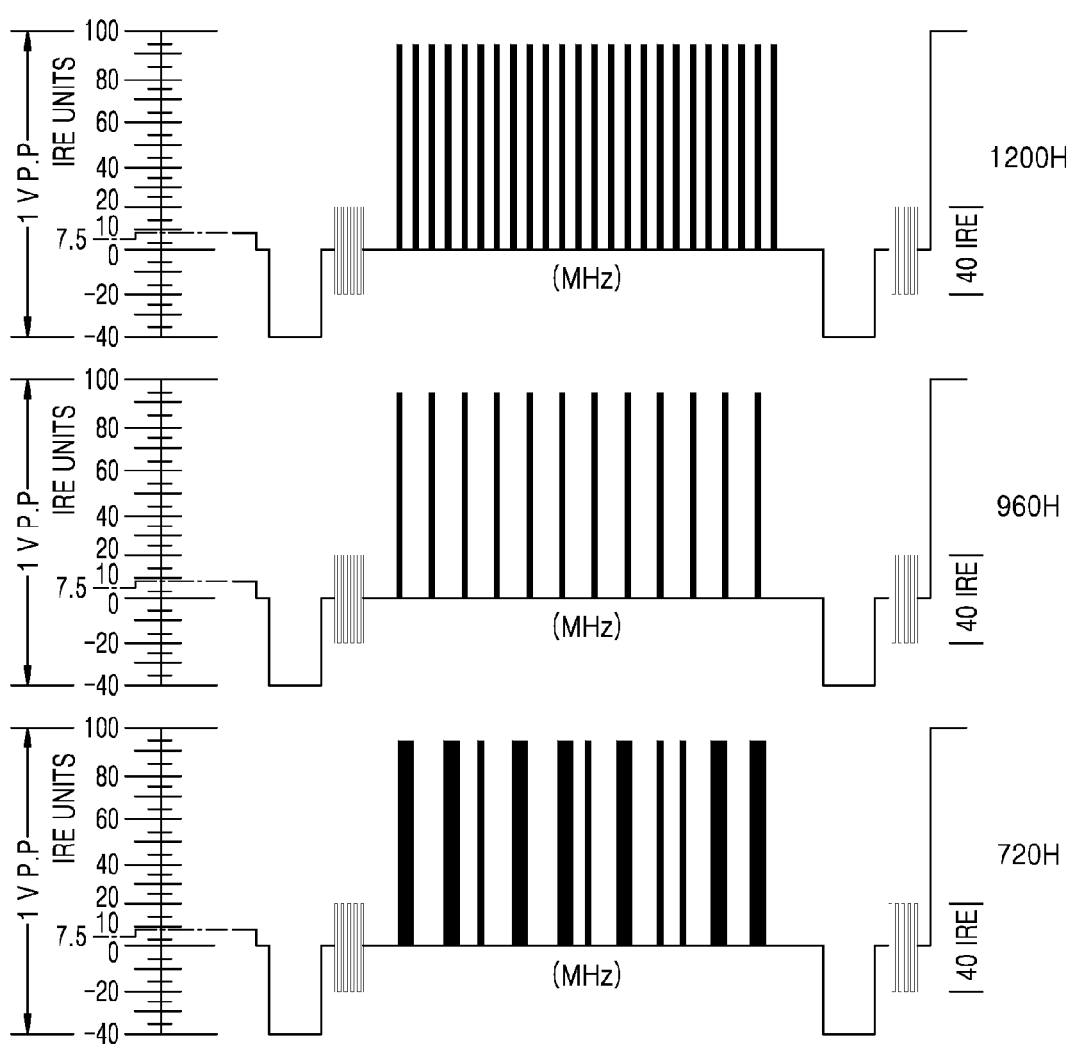

FIGS. 7 through 9 are diagrams for explaining a difference between sampling frequencies of an apparatus for converting an image signal, according to various exemplary embodiments.

Referring to FIG. 7, a test pattern that is to be input to a TV encoder may include a first pattern 31 having a highest frequency and a second pattern 32 having a lowest frequency, and a plurality of test patterns may be present between the first pattern 31 and the second pattern 32.

Referring to FIG. 8, an output pattern that is sampled at 22.5 MHz that is a sample frequency of a digital image signal of which the number of effective horizontal pixels is 1200, an output pattern that is sampled at 18 MHz that is a sample frequency of a digital image signal of which the number of effective horizontal pixels is 960, and an output pattern that is sampled at 13.5 MHz that is a sample frequency of a digital image signal of which the number of effective horizontal pixels is 720 are the same as the second pattern 32 having the lowest frequency. That is, according to the present exemplary embodiment, when an image having a low frequency is input, a resolution of an output image hardly varies according to a sample frequency.

Referring to FIG. 9, an output pattern that is sampled at 22.5 MHz that is a sample frequency of a digital image signal of which the number of effective horizontal pixels is 1200 is the same as the first pattern 31 having the highest frequency whereas an output pattern that is sampled at 18 MHz that is a sample frequency of a digital image signal of which the number of effective horizontal pixels is 960 and an output pattern that is sampled at 13.5 MHz that is a sample frequency of a digital image signal of which the number of effective horizontal pixels is 720 are different from the first pattern 31. That is, according to the present exemplary embodiment, when an image having a high frequency is input, a resolution of an image increases as a sample frequency increases.

Figure 10A:
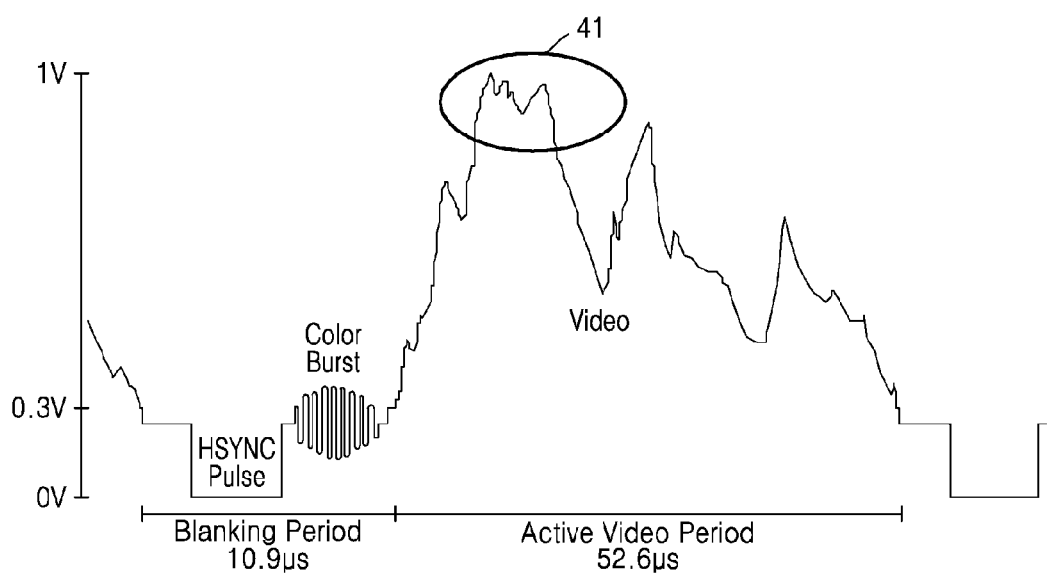
FIGS. 10A through 10C are graphs for explaining a difference between sampling frequencies of an apparatus for converting an image signal, according to various exemplary embodiments.
Figure 10B:
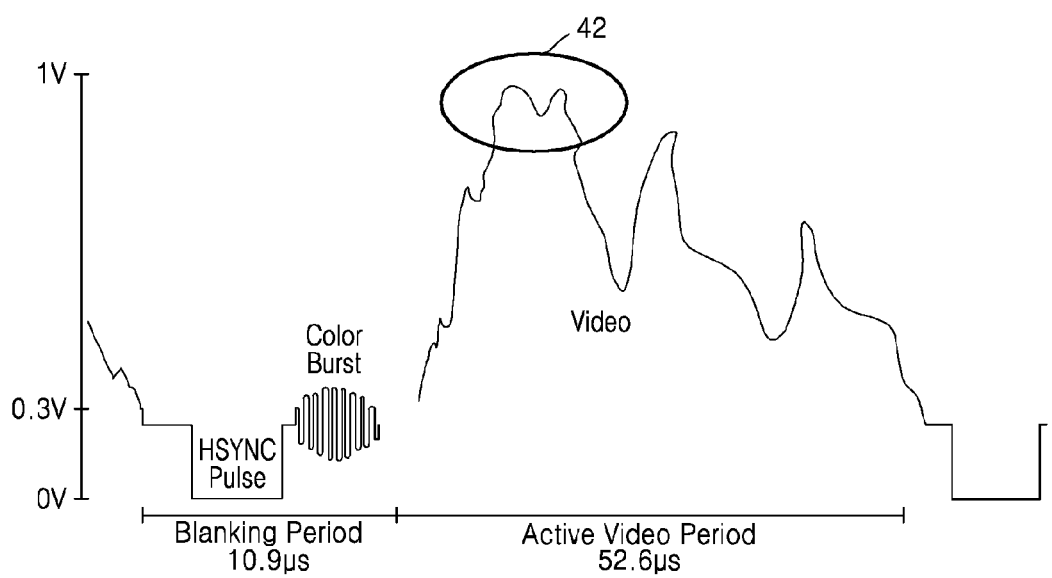
Figure 10C:
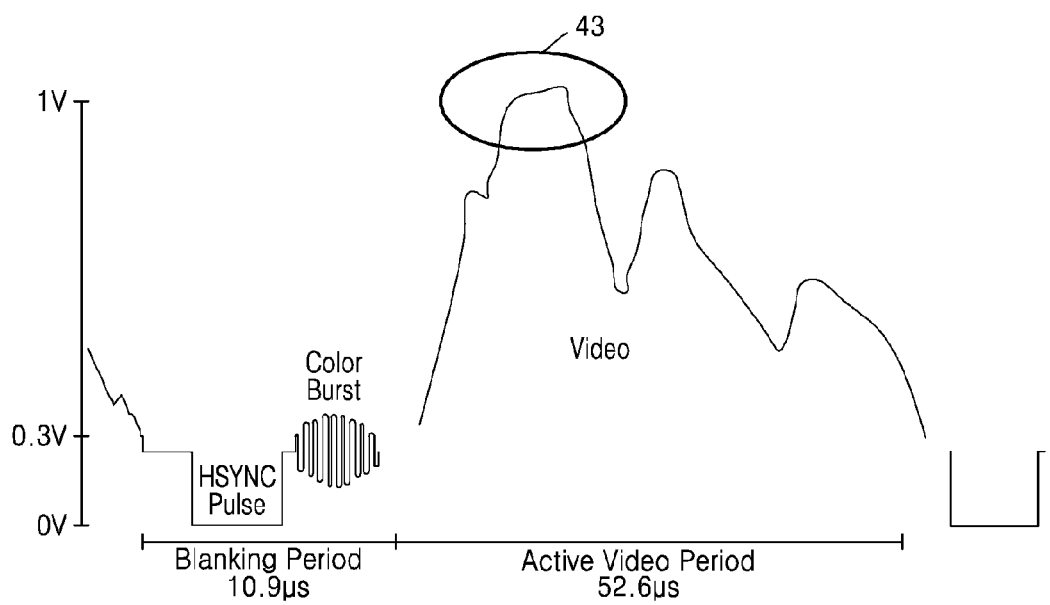

FIGS. 10A through 10C are diagrams for explaining a difference between sampling frequencies of an apparatus for converting an image signal, according to various exemplary embodiments.

Referring to FIG. 10A, the number of horizontal pixels of an image signal according to an exemplary embodiment is 1430, the number of effective horizontal pixels is 1200, a horizontal scan period is 63.556 µs, a sample frequency is 22.5 MHz, a vertical resolution is 525 lines, and a frame rate is 30 Hz. As such, according to the present exemplary embodiment, even when an input image signal has a high resolution, since a sample frequency that is proportional to the high resolution is used, high-frequency components may be preserved without being crushed as shown in a portion 41 and a horizontal scan period and a vertical resolution complying with the NTSC or PAL standard may be obtained.

Referring to FIG. 10B, the number of horizontal pixels of an image signal according to an exemplary embodiment is 1144, the number of effective horizontal pixels is 960, a horizontal scan period is 63.556 µs, a sample frequency is 18 MHz, a vertical resolution is 525 lines and a frame rate is 30 Hz. Like in FIG. 10A, a sample frequency that is proportional to a resolution according to the present exemplary embodiment is used in FIG. 10B. However, it is found that high-frequency components when a lower sample frequency is used as shown in a portion 42 are more crushed and output than those when a higher sample frequency is used.

Referring to FIG. 10C, the number of horizontal pixels of an image signal according to an exemplary embodiment is 858, the number of effective horizontal pixels is 720, a horizontal scan period is 63.556 µs, a sample frequency is 13.5 MHz, a vertical resolution is 525 lines, and a frame rate is 30 Hz. As such, it is found that when a lowest sample frequency is used, high-frequency components are considerably crushed and output as shown in a portion 43.

Figure 11:
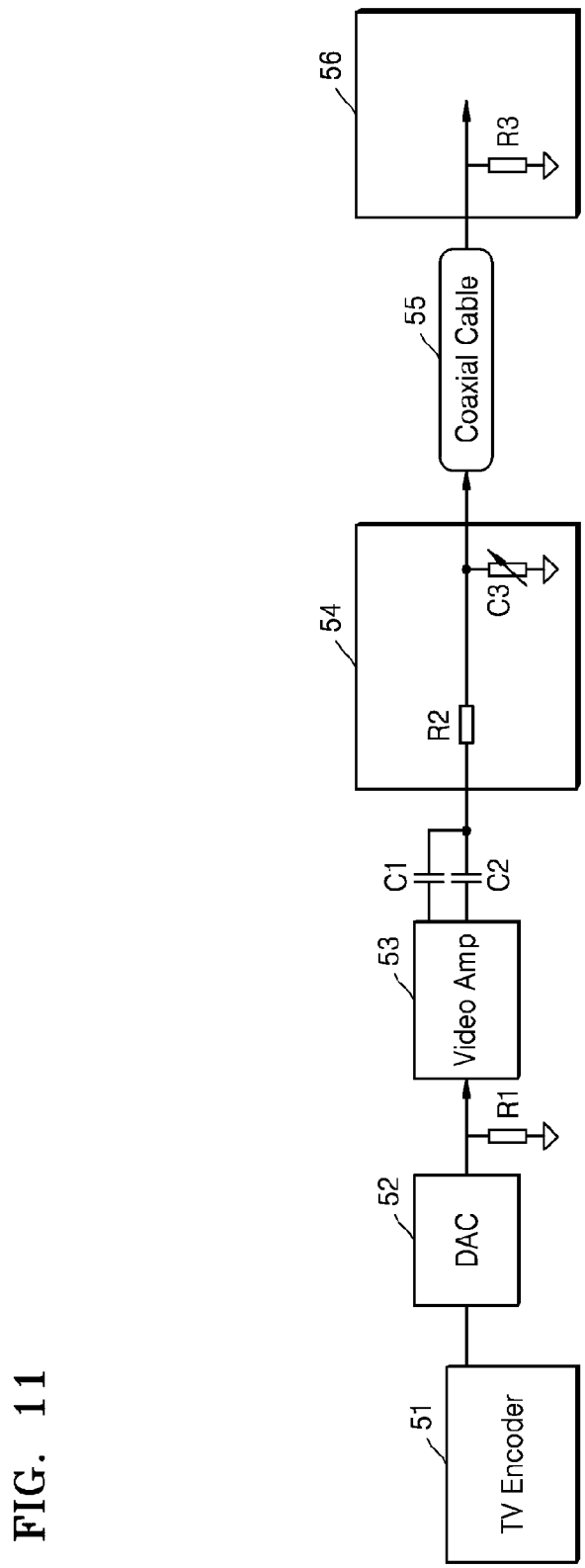
FIG. 11 is a circuit diagram illustrating an apparatus for converting an image signal, according to an exemplary embodiment.

FIG. 11 is a circuit diagram illustrating an apparatus for converting an image signal, according to an exemplary embodiment.

Referring to FIG. 11, a TV encoder 51, a DAC 52, a video amplifier 53, a low-pass filter 54, a coaxial cable 55, and a monitor 56 are connected, and the TV encoder 51 encodes a digital image signal in order to output an image that complies with an NTSC or PAL standard.

The DAC 52 converts the digital image signal that is output from the TV encoder 51 into an analog image signal. A resistance value of a first resistor R1 that is connected in parallel to a rear end of the DAC 52 may be 75Ω.

The video amplifier 53 may be a device having a cutoff frequency at which energy of 11.25 MHz that is a bandwidth of a Luma component of an image signal of FIG. 5 passes through.

The low-pass filter 54 may include a second resistor R2 and a third capacitor C3. A resistance value of the second resistor R2 may be 75Ω. The low-pass filter 54 may determine 11.25 MHz that is a bandwidth of a Luma component of an image signal of FIG. 5 as a cutoff frequency. Accordingly, a capacitance value of the third capacitor C3 may be equal to or less than 188 pF that is calculated based on a resistance value of the second resistor R2 and a frequency band that has to pass through the low-pass filter 54.

The low-pass filter 54 may pass through a video signal band of the analog image signal and may remove high-band noise. The low-pass filter 54 will be explained below with reference to FIGS. 12A through 12C.

Figure 12A:
FIGS. 12A through 12C are diagrams for explaining a low-pass filter according to an exemplary embodiment.
Figure 12B:
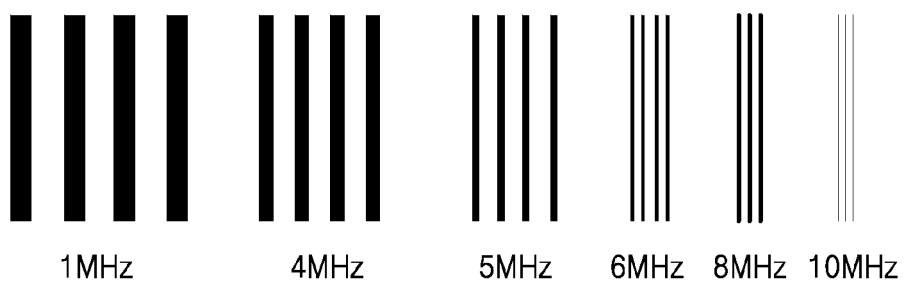
Figure 12C:
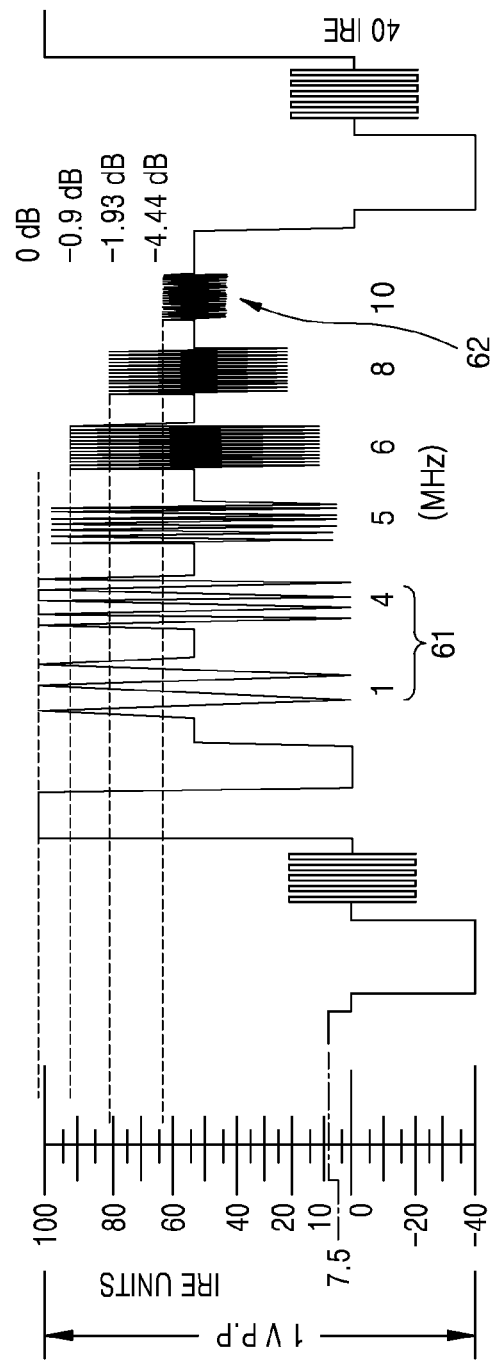

FIGS. 12A through 12C are diagrams for explaining the low-pass filter 54 according to an exemplary embodiment.

Referring to FIG. 12A, the low-pass filter 54 according to an exemplary embodiment passes through a signal having a frequency band that is lower than about 9 MHz.

The low-pass filter 54 may obtain output test patterns having various sizes of FIG. 12C from input test patterns having various frequencies of FIG. 12B. An output pattern 61 corresponding to an input test pattern having a low frequency, for example, 1 MHz or 4 MHz includes black and white lines that are clearly distinguished from each other whereas since an output voltage of an output pattern 62 corresponding to an input test pattern having a high frequency, for example, 10 MHz, is lower than 1 VP.P, the output pattern 62 is shown in dark gray, wherein black and white lines are not clearly distinguished from each other.

Accordingly, a capacitance value of the third capacitor C3 may be equal to or less than 188 pF that is calculated based on a resistance value of the second resistor R2 and a passband of the low-pass filter 54.

Referring back to FIG. 11, the analog image signal that passes through the low-pass filter 54 may be displayed on the monitor 56 through the coaxial cable 55. The monitor 56 may include a third resistor R3 having a resistance value of 75Ω and may output a signal whose level is a half of a level (6 dB) of a signal that passes through the video amplifier 53.

The exemplary embodiments may be implemented as computer programs that may be executed in a computer by using various elements, and the computer programs may be recorded on a computer-readable recording medium. Examples of the computer-readable medium include storage media such as magnetic media (e.g., hard discs, floppy discs, or magnetic tapes), optical media (e.g., compact disc-read only memories (CD-ROMs), or digital versatile discs (DVDs)), magneto-optical media (e.g., floptical discs), and hardware devices that are specially configured to store and carry out program commands (e.g., ROMs, RAMs, or flash memories). Furthermore, examples of the computer-readable recording medium include tangible media that may be transmitted through a network. For example, the computer-readable recording medium may be implemented as software or an application and may be transmitted and distributed through a network.

The computer programs may be designed and constructed particularly for the inventive concept or may be known to and may be used by one of ordinary skill in a field of computer software. Examples of the computer programs include a high-level language code that may be executed by a computer using an interpreter as well as a machine language code made by a compiler.

At least one of the components, elements or units represented by a block as illustrated in FIGS. 3 and 11, e.g., the controller 120 in FIG. 3, may be embodied as various numbers of hardware, software and/or firmware structures that execute respective functions described above, according to an exemplary embodiment. For example, at least one of these components, elements or units may use a direct circuit structure, such as a memory, processing, logic, a look-up table, etc. that may execute the respective functions through controls of one or more microprocessors or other control apparatuses. Also, at least one of these components, elements or units may be specifically embodied by a module, a program, or a part of code, which contains one or more executable instructions for performing specified logic functions, and executed by one or more microprocessors or other control apparatuses. Also, at least one of these components, elements or units may further include a processor such as a central processing unit (CPU) that performs the respective functions, a microprocessor, or the like. Two or more of these components, elements or units may be combined into one single component, element or unit which performs all operations or functions of the combined two or more components, elements of units. Also, at least part of functions of at least one of these components, elements or units may be performed by another of these components, element or units. Further, although a bus is not illustrated in the above block diagrams, communication between the components, elements or units may be performed through the bus. Functional aspects of the above exemplary embodiments may be implemented in algorithms that execute on one or more processors. Furthermore, the components, elements or units represented by a block or processing steps may employ any number of related art techniques for electronics configuration, signal processing and/or control, data processing and the like.

The particular implementations shown and described herein are illustrative examples of the inventive concept and are not intended to otherwise limit the scope of the inventive concept in any way. For the sake of brevity, conventional electronics, control systems, software development and other functional aspects of the systems may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. Moreover, no item or component is essential to the practice of the inventive concept unless the element is specifically described as "essential" or "critical".

The use of the terms "a" and "an" and "the" and similar referents in the context of describing the inventive concept (especially in the context of the following claims) are to be construed to cover both the singular and the plural. Furthermore, recitation of ranges of values herein are merely intended to serve as a shorthand method of referring individually to each separate value falling within the range, unless otherwise indicated herein, and each separate value is incorporated into the specification as if it were individually recited herein. Finally, the steps of all methods described herein can be performed in any suitable order unless otherwise indicated herein or otherwise clearly contradicted by context. The use of any and all examples, or exemplary language (e.g., "such as") provided herein, is intended merely to better illuminate the inventive concept and does not pose a limitation on the scope of the inventive concept unless otherwise claimed. Numerous modifications and adaptations will be readily apparent to those of ordinary skill in this art without departing from the spirit and scope of the inventive concept.

What is claimed is:

1. A method of converting a digital image signal into an analog image signal, the method comprising:
receiving a digital image signal that is obtained through an image sensor;
determining one of a national television system committee (NTSC) standard and a phase-alternating line (PAL) standard as a target standard;
changing a number of horizontal scan lines of the digital image signal to comply with a vertical resolution of the target standard;
generating a sample frequency by dividing a number of horizontal pixels of the digital image signal by a horizontal scan period that complies with the target standard;
converting the digital image signal having the changed number of horizontal scan lines into an analog image signal according to the sample frequency; and
transmitting the analog image to a video amplifier and a low-pass filter,
wherein the video amplifier is configured to amplify the analog image signal, and
wherein the low-pass filter is configured to pass through the amplified analog image signal, have a cutoff frequency of 11.25 MHz, and include a capacitor for preventing a surge.

2. The method of claim 1, wherein a capacitance value of the capacitor is equal to or less than 188 pF.

3. The method of claim 1, wherein the image sensor is a complementary metal-oxide-semiconductor (CMOS) image sensor.

4. The method of claim 1, wherein the horizontal scan period according to the NTSC standard is 63.556 µs.

5. The method of claim 4, wherein in the number of horizontal pixels, a number of effective horizontal pixels is 1320,
wherein the horizontal scan period comprises an effective horizontal scan period of 53.333 µs, and
wherein the sample frequency is generated at 24.75 MHz.

6. The method of claim 4, wherein in the number of horizontal pixels, a number of effective horizontal pixels is 1200 and the number of dummy horizontal pixels is 230,
wherein the horizontal scan period comprises an effective horizontal scan period of 53.333 µs, and
wherein the sample frequency is generated at 22.5 MHz.

7. The method of claim 1, wherein the horizontal scan period according to the PAL standard is 64 µs.

8. The method of claim 7, wherein in the number of horizontal pixels, a number of effective horizontal pixels is 1200 and the number of dummy horizontal pixels is 240,
wherein the horizontal scan period comprises an effective horizontal scan period of 53.333 µs, and
wherein the sample frequency is generated at 22.5 MHz.

9. The method of claim 1, wherein the sample frequency is in proportion to a resolution of the analog image signal.

10. An apparatus for converting a digital image signal into an analog image signal, the apparatus comprising:
a receiver configured to receive a digital image signal that is obtained through an image sensor;
a controller configured to determine one of a national television system committee (NTSC) standard and a phase-alternating line (PAL) standard as a target standard, change a number of horizontal scan lines of the digital image signal to comply with a vertical resolution of the target standard, generate a sample frequency by dividing a number of horizontal pixels of the digital image signal by a horizontal scan period that complies with the target standard, and convert the digital image signal having the changed number of horizontal scan lines into an analog image signal according to the sample frequency;
a video amplifier configured to amplify the analog image signal; and
a low-pass filter configured to pass through the amplified analog image signal, have a cutoff frequency of 11.25 MHz, and include a capacitor for preventing a surge.

11. The apparatus of claim 10, wherein a capacitance value of the capacitor is equal to or less than 188 pF.

12. The apparatus of claim 10, wherein the image sensor is a complementary metal-oxide-semiconductor (CMOS) image sensor.

13. The apparatus of claim 10, wherein the horizontal scan period according to the NTSC standard is 63.556 µs.

14. The apparatus of claim 13, wherein in the number of horizontal pixels, a number of effective horizontal pixels is 1320,
wherein the horizontal scan period comprises an effective horizontal scan period of 53.333 µs, and
wherein the sample frequency is generated at 24.75 MHz.

15. The apparatus of claim 13, wherein in the number of horizontal pixels of the digital image signal, a number of effective horizontal pixels is 1200,
wherein the horizontal scan period comprises an effective horizontal scan period of 53.333 µs, and
wherein the controller is configured to generate the sample frequency at 22.5 MHz.

16. The apparatus of claim 10, wherein the horizontal scan period according to the PAL standard is 64 µs.

17. The apparatus of claim 16, wherein in the number of horizontal pixels, a number of effective horizontal pixels is 1200 and the number of dummy horizontal pixels is 240,
wherein the horizontal scan period comprises an effective horizontal scan period of 53.333 µs, and
wherein the sample frequency is generated at 22.5 MHz.

18. The apparatus of claim 10, further comprising a storage storing information about the number of horizontal pixels of the digital image signal to comply with a horizontal scan period of the NTSC standard or the PAL standard.

19. A method of converting a digital image signal into an analog image signal, the method comprising:
receiving a digital image signal that is obtained through an image sensor;
determining one of a national television system committee (NTSC) standard and a phase-alternating line (PAL) standard as a target standard;

changing a number of horizontal scan lines of the digital image signal to comply with a vertical resolution of the target standard;

generating a sample frequency by dividing a number of horizontal pixels of the digital image signal by a horizontal scan period that complies with the target standard;

converting the digital image signal having the changed number of horizontal scan lines into an analog image signal according to the sample frequency; and transmitting the analog image to a video amplifier and a low-pass filter, wherein the video amplifier is configured to amplify the analog image signal, and wherein the low-pass filter is configured to include a capacitor having a capacitance value equal to or less than 188 pF.

\* \* \* \* \*